United States Patent [19]
Takahashi et al.

[11] 3,985,938
[45] *Oct. 12, 1976

[54] DIELECTRIC ETHYLENE COPOLYMER COMPOSITIONS CONTAINING ALKYLFLUORANTHENE

[75] Inventors: Masaaki Takahashi; Akira Ito, both of Tokyo; Yuriko Igarashi, Mitaka; Shichiro Kawada, Hitachi; Jiro Ogura, Hitachi; Ryoichi Ito, Hitachi, all of Japan

[73] Assignee: Kureha Kagaku Kogyo Kabushiki Kaisha, Tokyo, Japan

[ * ] Notice: The portion of the term of this patent subsequent to Oct. 28, 1992, has been disclaimed.

[22] Filed: Aug. 7, 1975

[21] Appl. No.: 602,804

Related U.S. Application Data

[63] Continuation-in-part of Ser. No. 481,257, June 20, 1974, Pat. No. 3,915,945.

[30] Foreign Application Priority Data

July 3, 1973  Japan.................................. 48-74363

[52] U.S. Cl..................................... 526/1; 252/63; 260/45.7 R
[51] Int. Cl.[2]...................... C08L 5/01; C08F 6/00; C08F 210/00
[58] Field of Search............. 260/93.7, 87.3, 88.1 R, 260/86.1 R, 87.5 B, 87.5 C

[56] References Cited
UNITED STATES PATENTS 3,062,771  11/1962  Boenau et al...................... 260/33.6
3,075,040  1/1963   Lemmerich et al................ 174/110
3,445,394  5/1969   Hunt..................................... 252/66
3,522,183  7/1970   Heidt................................. 260/45.9
3,542,682  11/1970  Mutaffio........................... 252/62.1
3,629,110  12/1971  Hunt................................. 252/63.2
3,632,680  1/1972   Hunt et al......................... 260/878

Primary Examiner—Joseph L. Schofer
Assistant Examiner—Herbert J. Lilling
Attorney, Agent, or Firm—Lane, Aitken, Dunner & Ziems

[57] ABSTRACT

Ethylene copolymer compositions having excellent dielectric properties comprising an alkylfluoranthene having the following formula:

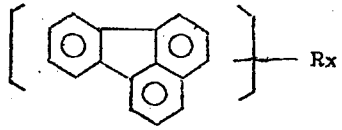

(wherein R represents an alkyl group containing from 1 to 4 carbon atoms, and $x$ is an integer of from 1 to 4, and when $x$ is an integer of 2 or greater, R may be different or the same) in an amount of at least 0.5 parts by weight per 100 parts by weight of an ethylene copolymer.

6 Claims, 4 Drawing Figures

DIELECTRIC ETHYLENE COPOLYMER COMPOSITIONS CONTAINING ALKYLFLUORANTHENE

CROSSREFERENCE TO RELATED APPLICATION

The present application is a continuation-in-part of applicants' copending application, U.S. Ser. No. 481,257, filed June 20, 1974, now U.S. Pat. No. 3,915,945 and entitled "DIELECTRIC POLYOLEFIN COMPOSITIONS", and claims the priority date of Japanese application No. 74363/1973 filed July 3, 1973.

BACKGROUND OF THE INVENTION

This invention relates to a novel dielectric composition and more particularly to a dielectric ethylene copolymer composition which retains excellent dielectric strength over a long period of time and is suitable for use as insulation in high voltage cables.

Polyolefins have been used in a variety of applications as insulating materials and accordingly many studies have been conducted toward improving the electrical breakdown strength of polyolefins. For example, U.S. Pat. Nos. 3,445,394 and 3,542,684 describe methods for improving electrical breakdown strength by adding various kinds of additives to the polyolefins. However, such methods have many disadvantages in that the additives used do not show good compatibility with polyolefins and that the resultant polyolefin compositions do not exhibit satisfactory properties as insulating materials, e.g., processibility, thermal stability, voltage stability, resistance to treeing which is a characteristic generally viewed as an early stage of dielectric break-down. Accordingly, a need exists to provide a novel polyolefin composition which has excellent properties as an electrical insulating material and which is free from the above-described disadvantages of the prior art.

SUMMARY OF THE INVENTION

It is therefore a main object of the present invention to provide a polyolefin composition which has excellent dielectric properties and which is particularly superior and stable in breakdown voltage strength.

The other objects and advantages, and features of the present invention will become clear from the following description.

According to the present invention, there is provided an ethylene copolymer composition comprising as a voltage stabilizer an alkylfluoranthene having the following formula:

(wherein R represents an alkyl group containing from 1 to 4 carbon atoms and $x$ is an integer of from 1 to 4, and when $x$ is an integer of 2 or greater, R may be different or the same) in an amount of at least 0.5 parts by weight of 100 parts by weight of an ethylene copolymer. These compositions have excellent dielectrical properties as well as excellent processibility and resistance to weight loss which usually results from the bleeding out, sublimation or evaporation of composition components. Thus, the compositions of the present invention, when used in cables or other electrical components, offer improved electric insulation. The generation of voids in the molding of the compositions is minimal. As insulators, they resist treeing and offer improved long-lasting voltage stability. Moreover, the alkylfluoroanthene does not impede the gelation of the copolymer during the stage in which cross-linking of the copolymer occurs.

DETAILED DESCRIPTION OF THE INVENTION

The alkylfluoranthene voltage stabilizers of the present invention having the general formula:

wherein R represents an alkyl group containing from 1 to 4 carbon atoms and $x$ is an integer of from 1 to 4, provided that when $x$ is an integer of 2 or more, R may be different or the same. More particularly, the alkyl-fluoranthene has one to four alkyl groups selected from methyl, ethyl, propyl and butyl. These alkyl groups are bonded at arbitrary positions in the fluoranthene nucleus. The alkylfluoranthene can be easily obtained by purifying after isolation from a polycyclic aromatic hydrocarbon-rich distillate such as coal tar, petroleum tar or the like, or by reacting, for alkylation, fluoranthene with a lower olefin having four or less carbon atoms in the presence of a Friedel-crafts catalyst such as aluminum chloride or the like, or a solid acid catalyst such as silica-alumina. Though the alkylfluoranthene has generally various isomers, purity is not required; a mixture containing one or more isomers may be employed. Furthermore, the voltage stabilizer of the present invention may be a mixture of two or more alkyl-fluoranthenes.

The reasons for employing an alkylfluoranthene containing alkyl groups having from 1 to 4 carbon atoms are as follows: (1) fluoranthene not substituted with an alkyl group is not sufficiently compatible with ethylene copolymers, i.e., when such a composition containing fluoranthene is prepared for use in an electrically insulating material, bleeding occurs on the material to an excessive extent; and (2) alkylfluoranthenes, substituted with 5 or more alkyl groups (of from 1 to 4 carbon atoms), as well as those substituted with an alkyl group containing five or more carbon atoms, when mixed with an ethylene copolymer, give a lower treeing characteristic voltage and undesirable voids are generated in the material in the course of molding. Accordingly, alkylfluoranthenes other than those specified are not suitable for the purpose of the invention.

According to the present invention, the substituted alkylfluoranthene is used in an amount of at least 0.5, preferably 0.5 – 10, parts by weight per 100 parts by weight of the ethylene copolymer. If the amount of the alkylfluoranthene per 100 parts by weight of a copolymer is less than 0.5 parts by weight, the desired effect on voltage stability is reduced. On the other hand, if the amount is above 10 parts by weight, the resultant composition may suffer from an undesirable increase of bleeding, reduction in tensile strength and loss of dielectric characteristics. Suitable copolymers which may be used in the compositions of the present invention include, for example, ethylenepropylene copolymers, ethylene-vinyl acetate copolymers, ethyleneethyl acrylate copolymers, ethylene-methyl acrylate copolymers, ethylene-methyl methacrylate copolymers, ethylene-vinyl alcohol copolymers, ethylene-propylene-vinyl acetate copolymers, ethylenevinyl chloride copolymers, and ethylene-tetrafluoroethylene copolymers. Ethylene-vinyl acetate copolymers are preferred. The ethylene copolymers of the present invention can be processed into electric-insulating materials by conventional methods. For example, when applied as an insulating material for a high voltage cable, the compositions of the present invention are mixed with a peroxide such as dicumylperoxide, 1,3 - bis (t-butylperoxyisopropyl) benzene, and if necessary, an antioxidant and a filler may also be added to the composition.

EXAMPLE 1

The various voltage stabilizing additives listed in Table 1 were each separately mixed with 100 parts by weight of a polyethylene having a melt index of 1.2 in amounts as shown in Table 1. To each mixture was further added 2.5 parts by weight of dicumylperoxide as a cross-linking agent, and 0.2 parts by weight of 2,2,4-trimethyl-1,2-hydroquinoline polymer as an antioxidant, and the resultant mixture was kneaded by means of hot rolls at 120° C for 10 minutes.

For comparison, similar compositions incorporating no voltage stabilizing agent and conventional voltage stabilizing additives were prepared as shown in Table 1.

Then, each of the polyethylene compositions was molded into a suitable shape. The resultant moldings were subjected to measurements of treeing characteristic voltage (KV), gelled fraction (%), resistance to void-forming, thermal deterioration, and long time voltage stability, in accordance with the following testing methods.

1. Determination of treeing characteristic voltage

Figure 1:
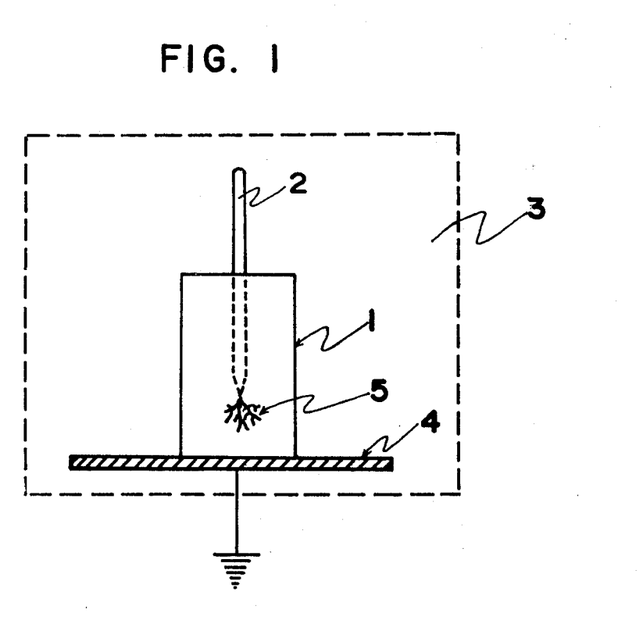
FIG. 1 is a view schematically showing an instrument for determining treeing characteristic voltages of samples obtained from various kinds of copolymer compositions of the present invention and prior art polyolefin compositions.

Each of the polyolefin compositions was pressmolded and cross-linked at a temperature of 180° C for 20 min. under a pressure of 480 kg/cm$^2$ to obtain a plate 1 having a size of 2.5 × 1.2 × 0.3 cm$^3$ as shown in FIG. 1. Then, the cross-linking agent remaining in the plate 1 was removed by drying the plate 1 in a hot air stream at 80° C for 48 hours or 1000 hours. Then, a test sample was obtained by imbedding a needle electrode 2 in one end of plate 1 to a depth so that the distance between the imbedded tip of the needle electrode 2 and the opposite end of the plate 1 was about 1 cm, as shown in FIG. 1. A number of test samples were simultaneously prepared by forming the polyolefin composition into a sheet having a thickness of 3 mm and a size of several times as large as that of the plate 1 in the same manner as described above, heat-treating the sheet to remove the cross-linking agent, imbedding a certain number of needle electrodes at a distance from each other into the sheet in the manner as mentioned above, and cutting the sheet into individual sample plates each having one needle electrode imbedded therein. The needle electrode 2 was anchored in the plate 1 by preheating the plate 1 at 120° C for 20 min. and then imbedding the needle into the plate at 120° C. In doing so, the resultant test sample showed no distortion. The needle electrode used in these tests had a tip end with a curvature of a radius of less than 5 $\mu$ and a tip angle of 30°. Each test sample comprising a test plate 1 and needle electrode 2 was allowed to stand for 5 days and was then placed in a vessel 3, which was provided with a plate electrode 4 and filled with a No. 2 insulating oil (Japanese Industrial Standards C 2320), placing the test plate on the electrode 4. Then, a voltage was applied between the needle electrode 2 and the plate electrode 4, separated by a distance of 1 cm until a "treeing" formation (fracture pattern) 5 in the plate portion adjacent to the tip end of the anchored needle electrode 2 was observed. Six or eight test samples were subjected to the above single needle test while increasing the applied voltage. The voltage at which 50% of the six or eight test samples developed treeing was recorded as the treeing characteristic voltage.

2. Gelled fraction (%)

The degree of the cross-linkage can be determined on the basis of the gelled fraction. Accordingly, by determining the gelled fraction by the following procedure, the effect of the added voltage stabilizer on the degree of cross-linkage of the polyolefin can be determined.

Each of the polyolefin compositions was pressmolded and cross-linked at 180° C for 20 min. under a pressure of 480 kg/cm$^2$ to obtain a sheet having a thickness of about 1 mm. Then, the sheet was cut into 5 × 5 cm$^2$ plates. Each plate was immersed in xylene at 110° C for about 24 hours, while replacing every 8 hours the xylene with fresh xylene, to dissolve xylene-soluble components contained in the plate. The resultant plate was further immersed overnight in methanol to extract the xylene content from the plate and then dried in a hot air stream at 80° C for 48 hours. The thus dried plate was weighed and the gelled fraction was calculated as follows:

Gelled Fraction = final weight/initial weight × 100

3. Resistance to Void-forming

The void-forming tendency of the polyolefin compositions during molding was determined.

Each of the polyolefin compositions was pressmolded using cellophane as a separating medium under controlled conditions designed to induce void-forming in the composition, i.e., at 160° C for 30 min. under 20 kg/cm$^2$. Then, the resultant molded sheet was cooled to 80° C under the same pressure to observe the voids, if any. Test results are indicated in Table 1 in the following manner; a polyolefin composition producing visible voids having a size greater than 50 $\mu$ is indicated by a symbol x, while a composition with no voids is indicted by a symbol A.

4. Thermal deterioration

Each of the polyolefin compositions was press-molded into a sheet having a thickness of about 1 mm in the same manner as in the gelled fraction testing method. The resultant sheet was cut into plates each having a size of 5 × 1.2 × 0.1 cm$^3$, which were suspended in a hot air circulating oven at 150°C to test for resistance to thermal deterioration. A plate which showed no deterioration over a period of 20 days under these conditions is designated by the symbol A, while any plate which deteriorated within 20 days is represented by a symbol x.

5. Long term voltage stability

Where the treeing characteristic voltage, as determined as under (1) above, for a sample was 9.5 KV or greater after drying 80° C for 1000 hours the sample is represented by a symbol A, a sample having a treeing characteristic voltage of greater than 7 KV and smaller than 9.5 KV by a symbol B, and a sample having a treeing characteristic voltage of 6 to 7 KV by a symbol x.

Test results are shown in Table 1 below. It will be understood from the Table that the polyethylene compositions of the present invention are superior to those using conventional voltage stabilizing additives.

Figure 2:
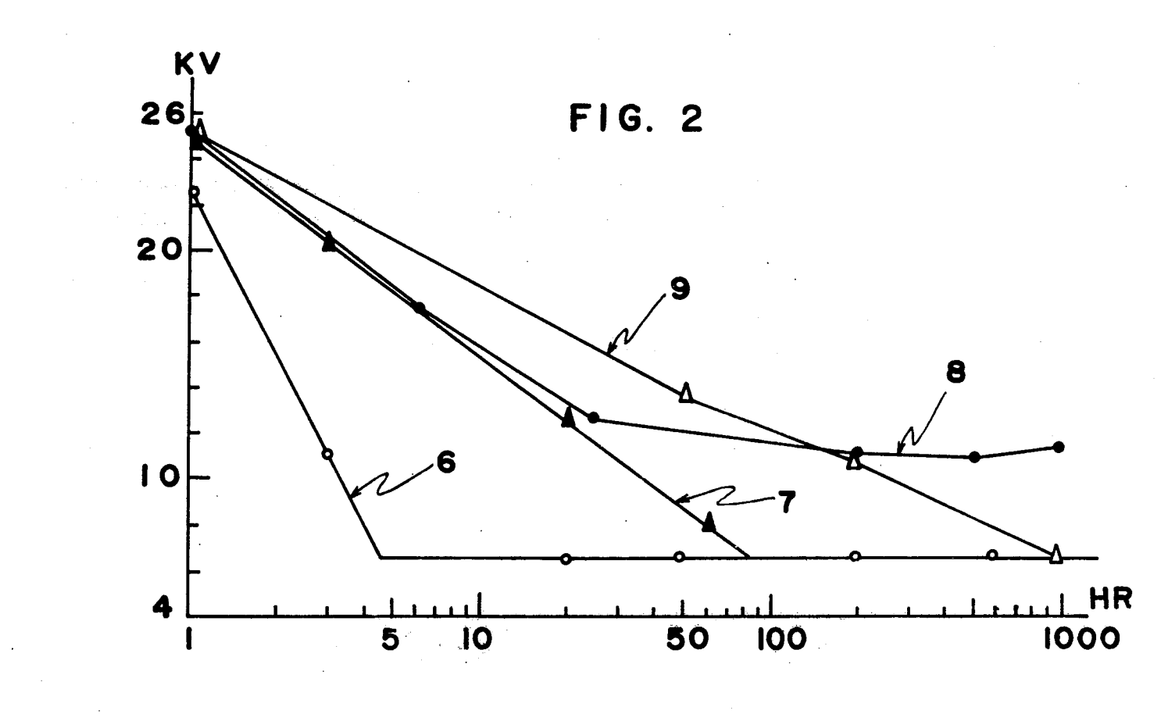
FIG. 2 is a graphical representation of changes in treeing characteristic voltage against lapses of time under drying conditions in hot air at 80° C, of samples tested as in FIG. 1.

The above process was repeated but without the addition of voltage stabilizing additives and using 2 parts by weight of each of conventional voltage stabilizing additives, i.e., pyrene and phenanthrene, instead of monopropylfluoranthene. The monopropylfluoranthene-containing composition, pyrene-containing composition, phenanthrene-containing composition and the composition without the additives were press-molded and cross-linked at a temperature of 180°C for 20 min. under a pressure of 280 kg/cm$^2$ to obtain a plate having a size of 2.5 × 1.2 × 0.3 cm for each composition. The plates were placed in a hot air stream at 80° C to detect changes in treeing characteristic voltages with lapse of time. Test results are shown in FIG. 2 by way of graphs showing the relation between the drying time and treeing characteristic voltage where the plates are dried at 80° C. In FIG. 2, the abscissa shows the drying time and the ordinate the treeing characteristic voltages of the samples. In FIG. 2, 6 represents the data for curve of the test sample not containing an additive; curve 7 represents the test sample containing phenanthrene; curve 8 represents the test sample containing monopropylfluoranthene; and curve 9 represents the test sample containing pyrene. It will be apparent from FIG. 2 that the respective treeing characteristic voltages show high values at the initial stage of drying since unreacted cross-linking agent

TABLE 1

| Additives | Boiling Point °C | Amount (parts by weight) per 100 parts of Polyethylene | Treeing Characteristic voltage KV | | Gelled Fraction % | Resistance To void forming | Thermal Deterioration | Long term voltage stability |
| --- | --- | --- | --- | --- | --- | --- | --- | --- |
| | | | Dried at 80°C for 48 hours | Dried at 80°C for 1000 hours | | | | |
| Monopropyl-fluoranthene | 400–420 | 1 | 12.3 | 11.0 | 92.0 | A | A | A |
| " | " | 2 | 12.5 | 11.5 | 91.3 | A | A | A |
| " | " | 5 | 16.5 | 13.5 | 87.5 | A | A | A |
| Dipropyl-fluoranthene | 440–470 | 2 | 12.0 | 12.0 | 90.9 | A | A | A |
| Tripropyl-fluoranthene | 470–510 | 2 | 11.0 | 11.5 | 91.0 | A | A | A |
| Methyl-fluoranthene | 380–400 | 2 | 13.8 | 11.8 | 91.5 | A | A | A |
| Ethyl-fluoranthene | 390–410 | 2 | 13.2 | 12.3 | 92.0 | A | A | A |
| Butyl-fluoranthene | 410–450 | 2 | 9.8 | 10.0 | 91.0 | A | A | A |
| Alkylfluoranthene mixture I* | 400–510 | 2 | 12.0 | 11.5 | 91.3 | A | A | A |
| Alkylfluoranthene mixture II** | 400–495 | 2 | 11.7 | 11.5 | 90.8 | A | A | A |
| No additive | — | — | 6.3 | 6.2 | 92.0 | A | x | x |
| Fluoranthene | 382 | 1 | 12.0 | 6.5 | 92.3 | A | x | x |
| " | " | 2 | 13.5 | 6.0 | 92.1 | A | x | x |
| " | " | 5 | 17.0 | 7.2 | 88.3 | A | x | x |
| Fluorene | 295 | 2 | 10.2 | 6.5 | 68.9 | x | x | x |
| Pyrene | 393 | 2 | 14.7 | 6.5 | 90.9 | A | A | x |
| Phenylnaphthalene | 358 | 2 | 12.8 | 7.3 | 83.0 | A | x | B |
| Sundex 8125*** | — | 2 | 7.9 | 6.0 | 83.2 | x | A | x |

Note:
*Mixture I composed of 60 wt % of monopropylfluoranthene, 30 wt % of dipropylfluoranthene, 10 wt % of tripropylfluoranthene, and a trace of tetrapropylfluoranthene.
**Mixture II composed of 50 wt % of monopropylfluoranthene and 50 wt % of monoethylfluoranthene.
***Trade name of Sun Oil Company for an aromatic rubber solvent.

EXAMPLE 2

2 parts by weight of monopropylfluoranthene was added to 100 parts by weight of polyethylene having a melt index of 1.2, with which were mixed 2.5 parts by weight of dicumylperoxide employed as a cross-linking agent and 0.2 parts by weight of 2,2,4-trimethyl-1,2-hydroquinoline polymer employed as an antioxidant. The resultant mixture was then kneaded by means of hot rolls at 120° C for 10 min.

remains in the samples. The treeing characteristic voltage is reduced with evaporation of the crosslinking agent component after a lapse of time. It will also be apparent from the figure that since the compatibility of phenanthrene and pyrene with polyethylene is far lower than that of monopropylfluoranthene, the treeing characteristic voltage of the samples made of the phenanthrene-containing composition and the pyrene composition containing no additive are reduced to a degree as low as that containing polyethylene composition, within a drying time of 100 hours and of 1000 hours, respectively.

EXAMPLE 3

Figure 3:
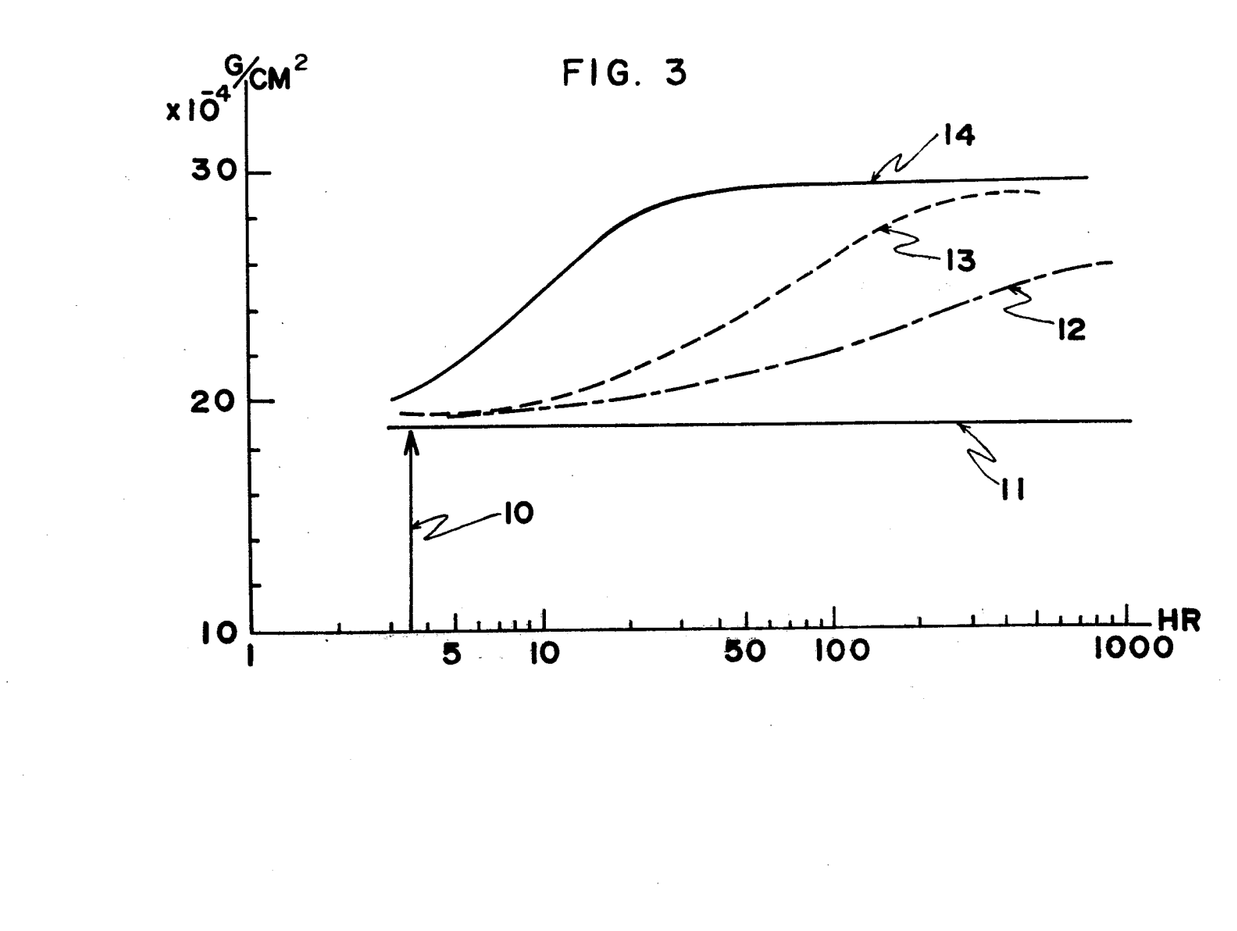
FIG. 3 is a graphical representation of the relation between the weight and drying time of the samples tested as in FIG. 1 maintained in hot air at 80° C.

Test samples were prepared in the same manner as in Example 2. The test samples were placed in a hot air stream at 80° C and changes in weight of the samples were observed over a predetermined period of time. Test results are shown in FIG. 3 by way of graphs showing the relation between the drying time and the weight of samples which are being dried at 80° C. On the abscissa the drying time and on the ordinate the sample weight (grams per unit surface area.) In FIG. 3, 10 indicates the loss weight caused by evaporation of the cross-linking agent from each of the samples; curve 11 represents the sample which contains no voltage stabilizing additives; curve 12 represents the monopropylfluoranthene-containing sample; curve 13 represents the pyrene-containing sample; and curve 14 represents the phenanthrene-containing sample. As will be apparent from the figure, in the initial period of the drying, i.e., within the first 3 hours, the weight of the samples is rapidly reduced because of evaporation of the cross-linking agent component from each sample. The weights of the phenanthrene-containing sample and the pyrene-containing sample were continuously reduced at a higher rate since both phenanthrene and pyrene have low affinity for polyethylene. On the other hand, the weight of monopropylfluoranthene-containing sample was reduced relatively slowly.

EXAMPLE 4

Figure 4:
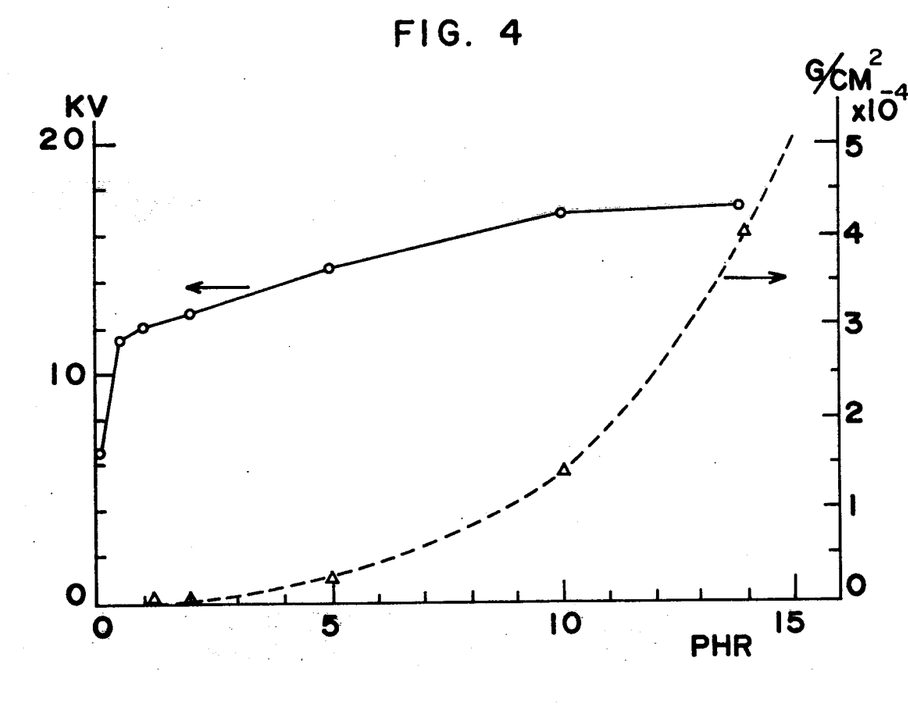
FIG. 4 is a graphical representation of the relation between the amount (parts by weight) of monopropyl-fluoranthene per 100 parts by weight of ethylene, the treeing characteristic voltage and amount of bleeding.

Monopropylfluoranthene was mixed in various amounts (parts by weight) with 100 parts by weight of polyethylene. Each mixture was further mixed with 2.5 parts by weight of dicumylperoxide and 0.2 parts by weight of 2,2,4-trimethyl-1,2-hydroquinoline polymer, and was kneaded on hot rollers at 120° C for 10 min. to obtain a polyethylene composition. Each of the compositions was molded into a plate in the same manner as in Example 2. By using the plates as test samples, treeing characteristic voltages and amounts of bleeding were determined. Test results are shown in FIG. 4 by way of graphs showing the relation between the amount (party by weight) of monopropylfluoranthene per 100 parts by weight of polyethylene, the treeing characteristic voltage and the amount of bleeding generated. On the abscissa is represented the amount (parts by weight) of monopropylfluoranthene per 100 parts by weight of polyethylene, while on the lefthand ordinate the treeing characteristic voltage of the samples and the righthand ordinate the amount of bleeding generated from the samples. The amount of bleeding is determined by subjecting each of the polyethylene compositions, which were used for preparing test plates, to cross-linking and press-molding to obtain a sheet having a thickness of 1 mm, drying the sheet at 80° C in a hot air circulating oven for about 5 hours, placing the resultant sheet for 30 days in an atmosphere having a temperature of 25° C and a relative humidity of 60%, and measuring the amount of matter bled on the surfaces of the samples. The bled amount is expressed by $g/cm^2$. In FIG. 4, the solid line connecting the symbols O represents the treeing characteristic voltage, while the dotted line connecting symbols Δ represents the bled amount. It will be apparent from FIg. 4 that though the treeing characteristic voltge increases with additional amounts of monopropylfluoranthene, the voltage becomes almost constant after the added amount reaches 10 parts by weight. Furthermore, when the added amount is increased beyond 10 parts by weight, the amount of bleeding sharply increases.

It should be noted that the above-mentioned tendencies remain unchanged even when alkylfluoranthenes other than monopropylfluoranthene are used or when a polyolefin other than polyethylene, e.g., an ethylene-base vinyl acetate copolymer, is used together with an alkylfluoranthene. Thus, the amount of alkylfluoranthene per 100 parts by weight of polyolefin is preferred to be within a range of 0.5 to 10 parts by weight.

EXAMPLE 5

The various alkylfluoranthenes shown in Table 2 were each separately mixed with 100 parts by weight of polyethylene having a melt index of 1.2, in the amounts shown in Table 2. Then, each of the mixtures was kneaded by means of hot rolls at 120° C for 10 min. and was press-molded at a temperature of 150° C for 5 min. under a pressure of 480 $kg/cm^2$ to obtain a molded sample (non-cross-linked). For comparison, the above process was repeated with polyethylene alone and with polyethylene mixed with the conventional additives shown in Table 2.

The thus obtained test samples were subjected to measurements of treeing characteristic voltages and long term treeing stability in the same manner as in Example 1. Furthermore, the compatability of the additives with polyethylene was determined by placing a pressed sheet having a thickness of 1 mm in a thermostatic chamber at 25° C and 60% relative humidity for 30 days, wiping the bleeding from the surfaces of the sheet by means of benzene, returning the sheet to the chamber for 1 day, and measuring the weight of the test samples. Test samples which showed no or almost no weight losses are indicated by a symbol A, and test samples which showed distinctive weight losses by a symbol. x.

Other tests to detect void generation, thermal deterioration and gelled fraction were not conducted since the non-cross-linked polyethylene used generally does not generate voids, and the determination of thermal deterioration and gelled fraction of the non-cross-linked polyethylene appeared meaningless.

Test results are shown in Table 2. It will be apparent from this Table that even the non-cross-linked polyethylene compositions of the present invention are far superior to those using known stabilizing additives.

TABLE 2

| Additives | Boiling Point °C | Amount (parts by weight) per 100 parts of polyethylene | Treeing Characteristic Voltage KV | | Long term voltage stability | Compatibility |
| --- | --- | --- | --- | --- | --- | --- |
| | | | Without drying | Dried at 80°C for 1000 hours | | |
| Monopropyl-fluoranthene | 400–420 | 1 | 12.0 | 12.1 | A | A |
| " | " | 2 | 13.3 | 12.9 | A | A |
| " | " | 5 | 18.5 | 17.6 | A | A |

TABLE 2-continued

| Additives | Boiling Point °C | Amount (parts by weight) per 100 parts of polyethylene | Treeing Characteristic Voltage KV | | Long term voltage stability | Compatibility |
|---|---|---|---|---|---|---|
| | | | Without drying | Dried at 80°C for 1000 hours | | |
| Dipropyl-fluoranthene | 440–470 | 2 | 12.5 | 12.0 | A | A |
| Tripropyl-fluoranthene | 470–510 | 2 | 12.3 | 11.9 | A | A |
| Methyl-fluoranthene | 380–400 | 2 | 14.0 | 12.5 | A | A |
| Ethyl-fluoranthene | 390–410 | 2 | 13.5 | 13.0 | A | A |
| Butyl-fluoranthene | 410–450 | 2 | 10.3 | 9.8 | A | A |
| Alkylfluoranthene Mixture I* | 400–510 | 2 | 13.3 | 12.2 | A | A |
| Alkylfluoranthene Mixture II** | 400–495 | 2 | 13.0 | 12.5 | A | A |
| No additive | — | 0 | 17.3 | 7.0 | x | — |
| Fluoranthene | 382 | 1 | 15.8 | 6.3 | x | x |
| '' | '' | 2 | 21.0 | 7.2 | x | x |
| '' | '' | 5 | greater than 25 | 7.0 | x | x |
| Fluorene | 295 | 2 | 16.0 | 6.5 | x | x |
| Pyrene | 393 | 2 | 23.0 | 6.5 | x | x |
| Phenylnaphthalene | 358 | 2 | 19.5 | 7.0 | x | x |
| Sundex 8125*** | — | 2 | 8.0 | 6.5 | x | A |

Note: Regarding *, , *, see Table 1.

EXAMPLE 6

A polyolefin composition was formed into an insulator for a wire cable of a conductive material (standard wire) having a sectional area of 1000 mm². The conductive wire was covered with a 2 mm thick inner semiconductive layer, a 20 mm thick insulator and a 1.5 mm thick outer semiconductive layer, in the order mentioned. The inner semiconductive layer was obtained by mixing an electrically conductive carbon black-containing ethylene-vinyl acetate copolymer with dicumylperoxide and heating the mixture to produce a cross-linked composition having a specific volume resistivity of 1 × 10³ Ω-cm. The insulator was made from a mixture of 2 parts by weight of dipropylfluoranthene used as a voltage stabilizer and 100 parts by weight of polyethylene, which was cross-linked in the same manner as in Example 1. The outer semiconductive layer had a composition similar to the inner semiconductive layer, and a specific volume resistivity of 1 × 10² Ω-cm.

The cable was prepared by simultaneously extruding the inner semiconductive layer, the insulator and the other semiconductive layer at 120° C, cross-linking the polyethylene with the extruded material by passing same through steam vapor at 200° C, and drying the resultant cable to remove residual cross-linking agent.

The resultant cable had excellent electrical characteristics as shown in Table 3.

Table 3

| | Cross-linked Polyethylene* without a voltage stabilizer | Cross-linked Polyethylene with dipropylfluoranthene |
|---|---|---|
| Impulse breakdown Voltage **KV | 1350/first application | 1450/first application |
| A-C breakdown voltage ***KV | 430/18 min. | 500/10 min. |
| Treeing characteristic voltage ****KV | 6.5 | 13.0 |

Note:
*The expression "cross-linked polyethylene without a voltage stabilizer" used refers to a cable which is made with a cross-linked polyethylene not containing dipropylfluoroanthene.
**"Impulse breakdown voltage" is the breakdown voltage value obtained by rendering the conductive layer of the cable negative and applying an initial voltage of 750 KV. In the measurement, a voltage of the same level is applied to the cable three times, and thereaftr raised by 50 KV after completion of measurement at one voltage level. As shown in Table 3, both of the sample cables were broken down by the first application of the voltage indicated.
***"A-C breakdown voltage" was determined by applying an initial voltage of 300 KV for 1 hour, raising the applying voltage (using a 30 min. step rise test) in 10 KV increments at 30 min. intervals until 390 KV, and (using a 1 hr. step rise test) in 10 KV increments at 1 hr. intervals after first applying a voltage of 400 KV. The time indicated in Table 3 means the period of time required to break down the cable by application of voltage.
****"Treeing characteristic voltage" was determined by sampling a sheet having a size of 10 × 25 × 3 mm³ from the cable insulator and testing in the same manner as in Example 1.

EXAMPLE 7

The various alkylfluoranthenes listed in Table 4 were each separately mixed with 100 parts by weight of ethylene vinyl acetate copolymer having a vinyl acetate content of 5% by weight. To each mixture was further added 2.5 parts by weight of dicumylperoxide as a cross-linking agent and 0.2 parts by weight of 2,2,4-trimethyl-1,2-dihydroquinoline polymer as an antioxidant and the resultant mixture was kneaded by means of hot rolls at 120° C for 10 minutes.

For comparison, the above procedure was repeated using the ethylene-vinyl acetate copolymer without any additives and the same copolymer with known additives such as polycyclic aromatic compounds and aromatic solvents.

Then, each of the ethylene-vinyl acetate copolymer compositions was molded into a suitable shape and the thus obtained test pieces were subjected to the same tests as described in Example 1. The results are shown in Table 4.

Table 4

| Additives | Boiling Point °C | Amount (parts by weight per 100 parts of Polyethylene | Treeing Characteristic voltage KV | | Gelled Fraction % | Resistance to Void-forming | Thermal Deterioration | Long term voltage stability |
|---|---|---|---|---|---|---|---|---|
| | | | Dried at 80°C for 48 hours | Dried at 80°C for 1000 hours | | | | |
| Monopropyl-fluoranthene | 400–420 | 1 | 12.5 | 11.2 | 92.5 | A | A | A |
| " | " | 2 | 12.9 | 11.8 | 91.3 | A | A | A |
| " | " | 5 | 17.1 | 13.8 | 88.0 | A | A | A |
| Dipropyl-fluoranthene | 440–470 | 2 | 12.5 | 12.8 | 91.2 | A | A | A |
| Tripropyl-fluoranthene | 470–510 | 2 | 11.3 | 11.7 | 91.5 | A | A | A |
| Methyl-fluoranthene | 380–400 | 2 | 14.2 | 12.2 | 92.0 | A | A | A |
| Ethyl-fluoranthene | 390–410 | 2 | 13.9 | 12.3 | 92.2 | A | A | A |
| Butyl-fluoranthene | 410–430 | 2 | 12.0 | 11.5 | 92.0 | A | A | A |
| Alkylfluoranthene mixture I* | 400–510 | 2 | 12.7 | 11.9 | 91.5 | A | A | A |
| Alkylfluoranthene mixture II** | 400–495 | 2 | 12.3 | 12.0 | 91.1 | A | A | A |
| No additive | — | — | 6.3 | 6.2 | 92.3 | A | X | X |
| Fluoranthene | 382 | 1 | 12.2 | 6.9 | 92.0 | A | X | X |
| " | " | 2 | 13.9 | 6.5 | 92.0 | A | X | X |
| " | " | 5 | 18.3 | 7.5 | 88.4 | A | X | X |
| Fluorene | 295 | 2 | 11.0 | 6.7 | 68.7 | X | X | X |
| Pyrene | 393 | 2 | 15.1 | 6.9 | 90.5 | A | A | X |
| Phenylnaphthalene | 358 | 2 | 13.2 | 7.7 | 82.5 | A | X | B |
| CD 101*** | — | 2 | 8.6 | 7.2 | 83.2 | X | A | X |
| Sundex 8125**** | — | 2 | 8.2 | 6.4 | 82.8 | X | A | X |

Note:
*Mixture I composed of 60 wt % of monopropylfluoranthene, 30 wt % of dipropylfluoranthene and 10 wt % of tripropylfluoranthene.
**Mixture II composed of 50 wt % of monopropylfluoranthene and 50 wt % of monoethylfluoranthene.
***Trade Name of Boron Co. for an aromatic solvent
****Trade Name of Sun Oil Company for an aromatic rubber solvent

We claim:
1. A dielectric composition comprising a copolymer of ethylene and at least one other monomer and an alkylfluoranthene of the formula wherein R represents an alkyl group containing from 1 to 4 carbon atoms and x is an integer of 1 to 4, provided that when x is an integer of 2 or greater R may be the same or different; said alkylfluoranthene being present in an amount of at least 0.5 parts by weight per 100 parts by weight of said copolymer.

2. The composition of claim 1, wherein said alkylfluoranthene is present in an amount of 0.5 to 10 parts by weight per 100 parts by weight of said copolymer.

3. The composition of claim 1, wherein said alkylfluoranthene is a mixture of alkylfluoranthenes.

4. The composition of claim 1, wherein said alkylfluoranthene is a mixture of isomers.

5. The composition of claim 1, wherein said one other monomer is selected from the group consisting of propylene, vinyl acetate, ethyl acrylate, methyl acrylate, methyl methacrylate, vinyl alcohol, vinyl chloride and tetrafluoroethylene.

6. The composition of claim 1, wherein said alkylfluoranthene is selected from the group consisting of methylfluoroanthene, ethylfluoranthene monopropylfluoranthene, dipropylfluoranthene, tripropylfluoranthene, butylfluoranthene and mixtures thereof.

* * * * *